(12) United States Patent
Chong

(10) Patent No.: US 7,382,735 B2
(45) Date of Patent: *Jun. 3, 2008

(54) SYSTEM AND METHOD FOR MONITORING A PACKET NETWORK

(75) Inventor: Raymond L. Chong, San Jose, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 843 days.

This patent is subject to a terminal disclaimer.

(21) Appl. No.: 10/760,026

(22) Filed: Jan. 16, 2004

(65) Prior Publication Data

US 2004/0151127 A1 Aug. 5, 2004

Related U.S. Application Data

(63) Continuation of application No. 10/105,600, filed on Mar. 20, 2002, now Pat. No. 6,738,353.

(51) Int. Cl.
H04L 12/26 (2006.01)
H04L 12/28 (2006.01)
H04M 3/22 (2006.01)

(52) U.S. Cl. .............. 370/252; 370/248; 379/32.01
(58) Field of Classification Search ................ 370/252
See application file for complete search history.

(56) References Cited

U.S. PATENT DOCUMENTS

| 5,715,239 A * | 2/1998 | Hyodo et al. ............... 370/248 |
| 6,292,468 B1 * | 9/2001 | Sanderson .................. 370/241 |
| 7,173,910 B2 * | 2/2007 | Goodman ................... 370/252 |
| 2001/0036192 A1 * | 11/2001 | Chiles et al. ............... 370/401 |
| 2002/0087711 A1 * | 7/2002 | Leung ........................ 709/233 |
| 2003/0163772 A1 * | 8/2003 | Jaworski ..................... 714/704 |

* cited by examiner

Primary Examiner—Ronald Abelson
(74) Attorney, Agent, or Firm—Mikio Ishimaru

(57) ABSTRACT

A method and system is provided for monitoring the quality of signal transmissions in a communications network by calculating Quality of Services (QoS) scores and corresponding Transmission Impairment Test (TIT) scores, and then monitoring a QoS score to predict a corresponding TIT score. When the predicted TIT score goes below a minimum value, an administrator of the communications network will be informed so that the administrator can determine if services may be needed to restore the quality of signal transmissions. In an embodiment, the communications network includes a cable modem termination system (CMTS); a voice band tester (VBT) coupled to the CMTS; a cable modem tester coupled to the CMTS; and a Voice over Internet Packet (VoIP) monitoring device coupled to the CMTS and the voice band tester. The cable modem tester is located at a location remote from the VBT.

18 Claims, 4 Drawing Sheets

SYSTEM AND METHOD FOR MONITORING A PACKET NETWORK

CROSS-REFERENCE TO RELATED APPLICATION(S)

This is a continuation of application Ser. No. 10/105,600 filed Mar. 20, 2002 now U.S. Pat. No. 6,738,353 which is hereby incorporated by reference herein.

TECHNICAL FIELD

The present invention relates generally to communication networks, and more specifically to the monitoring and management of quality of signal transmissions in a communications network.

BACKGROUND ART

Originally, cable networks were established to transmit television signals to homes and offices. Cable networks provided advantages over transmission television networks that included providing a clearer signal and a greater selection of channels. These networks were made up of co-axial cables routed in a tree and branch structure to customer sites and were intended simply to provide customers with analog television signals.

More recently, cable networks have been converted to transmit digital signals in a hybrid of fiber optic cable and co-axial cable structures. These converted networks accommodate not only traditional, analog television signals but also digital television signals, digital data signals and telephone signals. These cable networks use packet switching techniques to transfer information (data) over packet networks using packet switching techniques.

Digital television signals provide a crisper, more detailed picture along with enhanced sound. With the capability to transmit digital data signals, cable networks may now be coupled to the Internet thereby providing homes and offices access to the Internet. This Internet access is generally faster than access provided by other technologies. In addition, cable networks may now be used to transmit telephone voice signals in the form of packetized data. This involves a substantial savings in the amount of wiring around houses and offices because one co-axial cable can now carry analog, digital and voice signals.

Another signal transmission technology that offers significant improvement in data transfer is the Digital Subscriber Line (DSL) technology. DSL technology provides increased communications bandwidth while using existing twisted-pair copper lines that are prevalent throughout much of the world. DSL delivers a basic data transfer rate of 128 kbps. High speed DSL, or HDSL, can deliver a data transfer rate of 1.544 megabits per second (Mbps) in North America, and 2.048 Mbps elsewhere. Asymmetric DSL, or ADSL, can deliver data rates ranging from 1.5 to 9.0 Mbps on a downstream or receiving path, and 16 to 800 kbps on an upstream or sending path. Taken together, varying DSL technologies are referred to as xDSL.

A conventional xDSL communication network includes a Main Distribution Frame (MDF), an access matrix, a DSL Access Multiplexer (DSLAM), and a test unit. The MDF is coupled to the access matrix, which itself is coupled to the DSLAM and the test unit. The MDF, the access matrix, the test unit, and the DSLAM each reside at an xDSL service provider site (or Central Office). At a customer site, a set of Customer Premises Equipment (CPE) units is connected to the MDF. Each CPE unit includes an xDSL modem.

To monitor the quality of the transmission of telephone or voice signals in the form of packetized data, various transmission impairment tests (TIT) are used. One common type of transmission impairment test is the Perceptual Speech Quality Measurement (PSQM) according to the International Telecommunication Union (ITU) P.861 Standard. Information about ITU and ITU Standard P.861 is available at http://www.itu.ch. Determination of a PSQM score typically involves sending of a PSQM file from a home device to a remote device, and calculating a PSQM score by the remote device based on the PSQM file received at the remote device. A PSQM file is a file including digital signals representative of voice signals of various people (e.g., men, women, children, etc.) speaking different languages. Alternatively, a PSQM score can be determined by sending a PSQM file from a remote device to a home device, and calculating the PSQM score by the home device based on the PSQM file received at the home device. The PSQM score is a number between one and seven where a higher number represents higher quality.

Another type of TIT is the Perceptual Evaluation of Speech Quality (PESQ) according to the ITU P.862 Standard. Information about ITU P.862 is available at http://www.itu.ch. PESQ has been found to be more accurate than PSQM at predicting quality in a very wide range of networks, including the speed transmission quality of packet-oriented networks. The PESQ score is a number between one and seven where a higher number represents higher quality.

The quality of the transmission of telephone or voice signals in the form of packetized data is also measured by another criteria commonly known as the Quality of Services (QoS). The QoS is a measurement of the amount of packet losses, jitter, delay, etc in the signal transmission. Transmission impairment tests (e.g., PSQM and PESQ), and QoS are important criteria to determine the quality of signal transmissions in a packetized network.

It should be noted that the TIT scores is more difficult to obtain than the QoS score as the TIT score, such as the PSQM score, varies with time and location of the measurement. Therefore, it would be desirable to correlate the TIT scores with a corresponding QoS score by measuring the TIT scores and the QoS score for the same signal transmission. This would allow a user (or an administrator) of the packet network to use a QoS score to predict the corresponding TIT scores. When the predicted TIT score drops below a minimum value indicative of network problems, the administrator will be informed to determine whether services to the network are needed to restore the signal transmission quality.

However, there are problems associated with the prior art systems that make the correlation of TIT scores and QoS scores complicated and expensive. First, even for a small region, thousands of phone calls are being made at any given time which makes it very difficult to keep track of a particular test telephone call to allow the calculation of TIT score and QoS score. Second, the TIT scores vary from location to location and also from time to time for the same location because of variations in call patterns and the traffic conditions of the packet network.

Thus, there has long been a need for a more economical and simple monitoring method and system, which would monitor and calculate TIT scores, such as PSQM scores and PESQ scores, and QoS scores for signal transmissions over a packet network; and then use QoS scores to provide an accurate prediction of the corresponding TIT scores.

DISCLOSURE OF THE INVENTION

The present invention provides a method and system for monitoring the quality of signal transmissions in a communications network.

The present invention further provides an economical and simple method and system for calculating both Transmission Impairment Test (TIT) scores and QoS scores for signal transmissions over a communications network.

The present invention still further provides a method and system for providing a correlation between TIT scores and QoS scores of signal transmissions over a communications network, thus allowing a user of the communications network to use a QoS score to predict the corresponding TIT score. When the TIT score falls below a minimum TIT score, the user may be informed and will have an opportunity to determine if service to the communications network is required to restore signal transmission quality.

The present invention provides a communications network having a cable modem termination system (CMTS); a voice band tester (VBT) coupled to the CMTS; a cable modem tester coupled to the CMTS; and a Voice over Internet Packet (VoIP) monitoring device coupled to the CMTS and the VBT. The VBT is located at a first location and the cable modem tester is located at a second location remote from the first location. The cable modem tester is adapted to provide a first communication signal to the voice band tester via the CMTS. The VoIP monitoring device is adapted to monitor the first communication signal and calculate a first Quality of Services (QoS) score based on traffic density between the CMTS and the VBT. The VBT is further adapted to calculate a first Transmission Impairment Test (TIT) score based on the first communication signal and a first received communication signal received by the VBT from the cable modem tester and provide the first TIT score to the VoIP monitoring device. The first TIT score could be a score such as a Perceptual Speech Quality Measurement (PSQM) score, or a Perceptual Evaluation of Speech Quality (PESQ) score.

The present invention further provides a method for monitoring quality of signal transmissions within a communications network. The method includes the steps of: (a) providing a first communication signal from a cable modem tester located at a first location to a voice band tester (VBT) located at a second location remote from the first location via a Cable Modem Termination System (CMTS); (b) identifying the first communication signal and begins monitoring signal transmissions from the cable modem tester to the VBT via the CMTS; (c) calculating a first Transmission Impairment Test (TIT) score based on the first communication signal and a first received communication signal received by the VBT from the cable modem tester; (d) providing the first TIT score to a Voice over Internet Packet (VoIP) monitoring device; and (e) calculating a first Quality of Services (QoS) score based on traffic density between the CMTS and the VBT.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
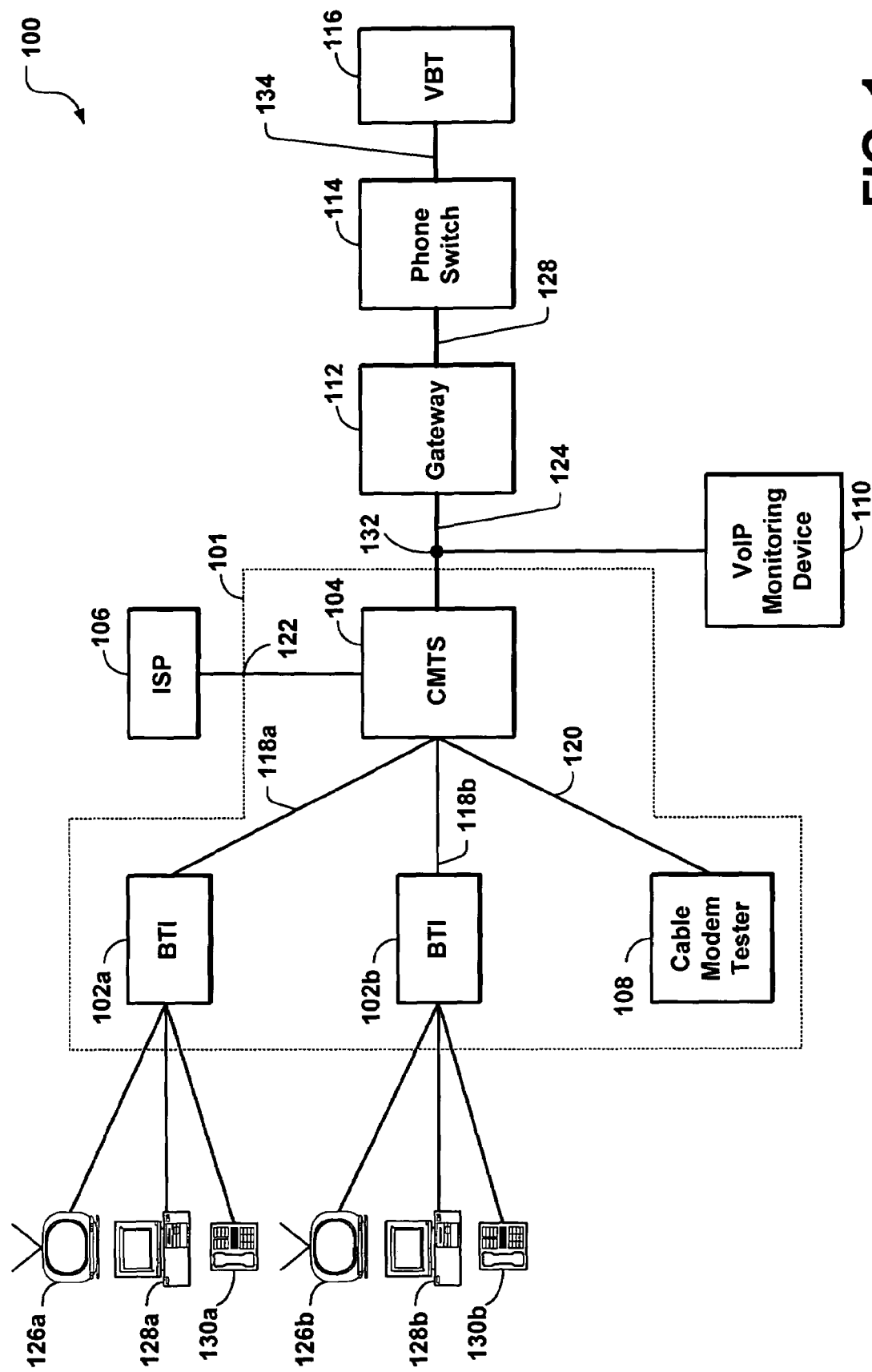
FIG. 1 is a block diagram of a communication network constructed in accordance with the present invention.

Referring now to FIG. 1, therein is shown a block diagram of a communications network 100, e.g., a packet network, constructed in accordance with the present invention.

The communications network 100 includes a network system 101, which is exemplified by a cable network system herein, but that can be any type of network system, including a wired system, a wireless system, or a combination thereof. The network system 101 includes a plurality of Broadband Termination Interfaces (BTIs) 102a and 102b, a Cable Modem Termination System (CMTS) 104, and a cable modem tester 108.

The communications network 100 also includes an Internet Service Provider (ISP) 106, a Voice Over Internet Packet (VoIP) monitoring device 110, a gateway 112, a telephone switch 114, and a Voice Band Tester (VBT) 116. The CMTS 104 is coupled to the BTIs 102a and 102b via co-axial cables 118a and 118b, respectively. For simplicity of illustration, only two BTIs (102a and 102b) are shown. It should be understood that the CMTS 104 may be connected to a large number of BTIs.

The CMTS 104 is coupled to the cable modem tester 108 via a co-axial cable 120, and to the ISP 106 via a conventional backbone line 122. The CMTS 104 is also coupled to the gateway 112 via a co-axial cable 124. The BTI 102a is coupled to a television 126a, a personal computer (PC) 128a, and a telephone 130a. Similarly, BTI 102b is coupled to a television 126b, a PC 128b, and a telephone 130b.

The VoIP monitoring device 110 is coupled to an endpoint 132 of the co-axial cable 124 so that it can monitor the communication between the CMTS 104 and a VBT 116 through the gateway 112. The gateway 112 is coupled to the telephone switch 114 via a co-axial cable 128. The telephone switch 114 is coupled to the VBT 116 via a telephone wire 134.

The BTIs 102a and 102b are typically located at customer sites. The CMTS 104 and the gateway 112 are typically located in a central office and the VoIP monitoring device 110, the telephone switch 114, and the VBT 116 are located between the central office and the customer sites. The cable modem tester 108 is typically located at a customer site and may be used in place of a BTI at a customer site. Alternatively, the cable modem tester 108 may be integrated with a BTI (102a or 102b) at a customer site.

Each of the BTIs 102a and 102b converts broadband signals from the CMTS 104 to television, packetized data, and video/voice signals for use by each of the televisions 126a and 126b, PC 128a and 128b, and telephone 130a and 130b. Each of the BTIs 102a and 102b also converts packetized data, and video/voice signals from each of the PC 128a and 128b, and telephone 130a and 130b to broadband signals and provide the broadband signals to the CMTS 104.

The CMTS 104 functions as a router, which is an internetworking device, that expedites message delivery by determining the optimal path along which network traffic (or signals) should be forwarded. The CMTS 104 may optionally include a computer and a memory (not shown) for data storage.

The cable modem tester 108 performs Perceptual Speech Quality Measurement (PSQM) calculation and determines the PSQM scores for telephone calls from the VBT 116 to the cable modem tester 108. The PSQM scores are used as a measure of the quality of the transmission of voice signals according to the ITU Standard P.861.

The VBT 116 is also capable of performing PSQM calculation and determines the PSQM scores for telephone calls from the cable modem tester 108 to the VBT 116.

Each of the cable modem testers 108 and the VBTs 116 keeps a copy of an original PSQM file. The copies of the original PSQM file do not need to be identical.

In another embodiment, the cable modem tester 108 and the VBT 116 are capable of performing other types of transmission impairment tests (TIT), such as the Perceptual Evaluation of Speech Quality (PESQ) according to the ITU P.862 Standard.

The ISP 106 is a conventional Internet service provider that provides Internet service to a user of the communications network 100.

The VoIP monitoring device 110 manages network quality, including monitoring and assessing Quality of Services (QoS) for each connection in a network. A QoS result typically includes the computation of packet loss, latency and jitter that are the most common problems that affect real time applications such as voice. Packet loss often increases with traffic and congestion. Buffering requirements causes latency. Jitter results from unequal queuing and routing of network nodes. A discussion of QoS can be found in Request for Comment (RFC) 1889 document, which is available from a number of sources including http://www.pasteur.fr/infosci/RFC. RFCs are the official publications of the Internet and have been used since 1969 to describe and obtain comments about protocol, procedures, and programs applicable to the Internet. The RFC 1889 document defines a real-time transport protocol, consisting of two closely linked parts. The first part contains the data carrying the real-time properties (RTP). The RTP provides end-to-end delivery services for data with real-time characteristics, such as interactive audio and video. The second part is the RTP control protocol (RTCP), which is used to monitor the quality of services and to convey information about the participants in an on-going session.

The VoIP monitoring device 110 is adapted to provide per call QoS results. The QoS results provide the detail needed to diagnose a network and its effect on live applications. The VoIP monitoring device 110 provides real time monitoring and identification of packet irregularities, which may lead to significant cost savings in resolving network problems.

An example of such VoIP monitoring device is the Ghepardo Protocol Analyzer/Server, available from Sunrise Telecom of San Jose, Calif.

The VoIP monitoring device 110 monitors the communications between the CMTS 104 and the gateway 112. The VoIP monitoring device 110 determines the QoS of calls between the cable modem tester 108 (via the CMTS 104) and the VBT 116 and correlates the QoS score with its corresponding PSQM score for any particular test telephone call.

The VoIP monitoring device 110 may track telephone calls using either a detection of content-based information, such as RTP packet that is based on the RFC 1889 Standard, or a detection of signaling-based information, such as by adding a code "X" commands used in the Packet Cable Network Base Call Signal (NCS) Protocol. The NCS Protocol permits a user to create special command if it's preceded with an "X". For example, in one embodiment, the code "XTST" means "test".

In one embodiment, the telephone switch 114 is a conventional 5ESS switch commonly used in offices and homes.

Figure 2A:
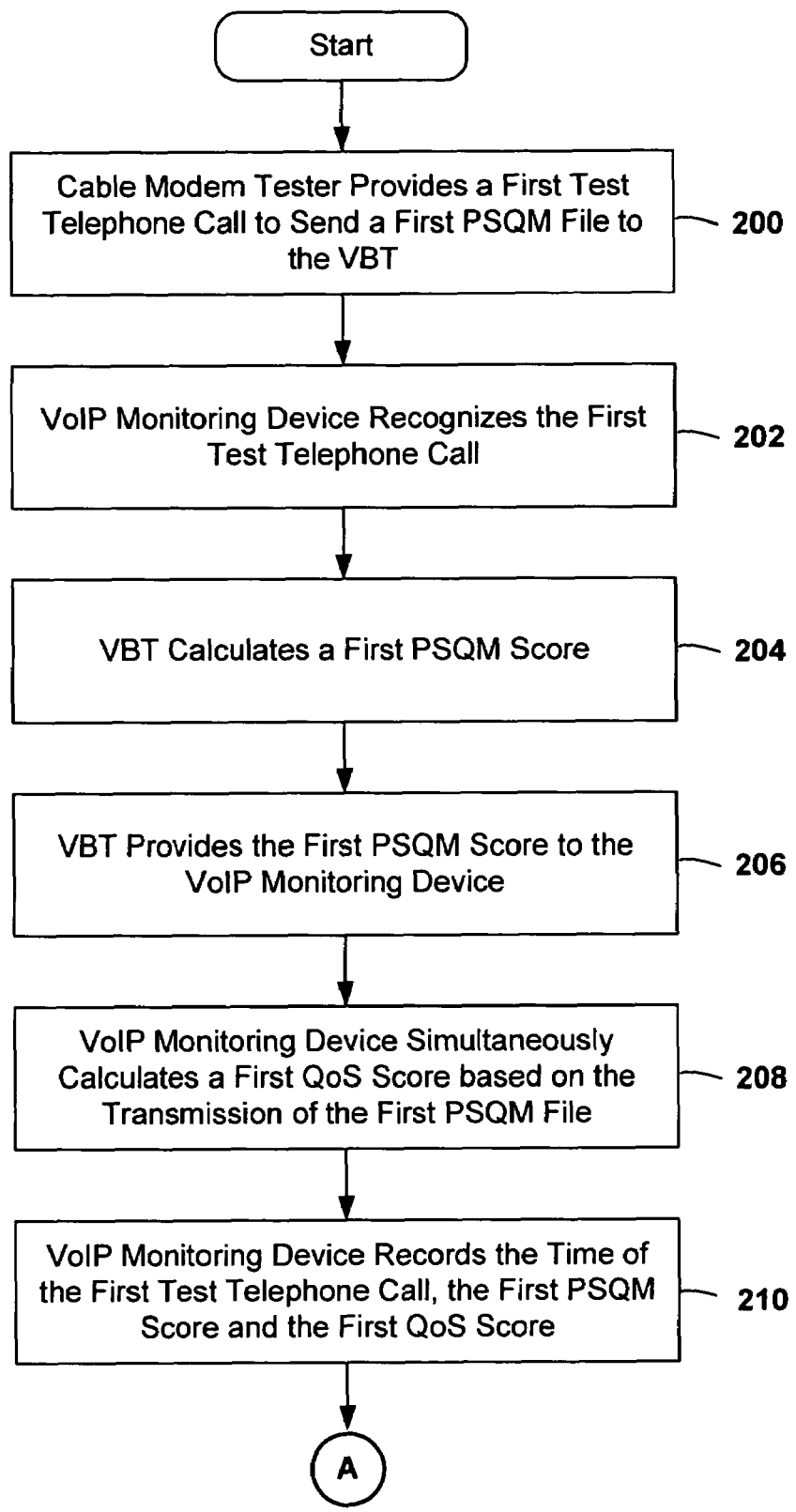
FIGS. 2A and 2B are flowcharts which illustrate a method for determining the PSQM scores and QoS scores of test telephone calls using a communication network as shown in FIG. 1 in accordance with the present invention.
Figure 2B:
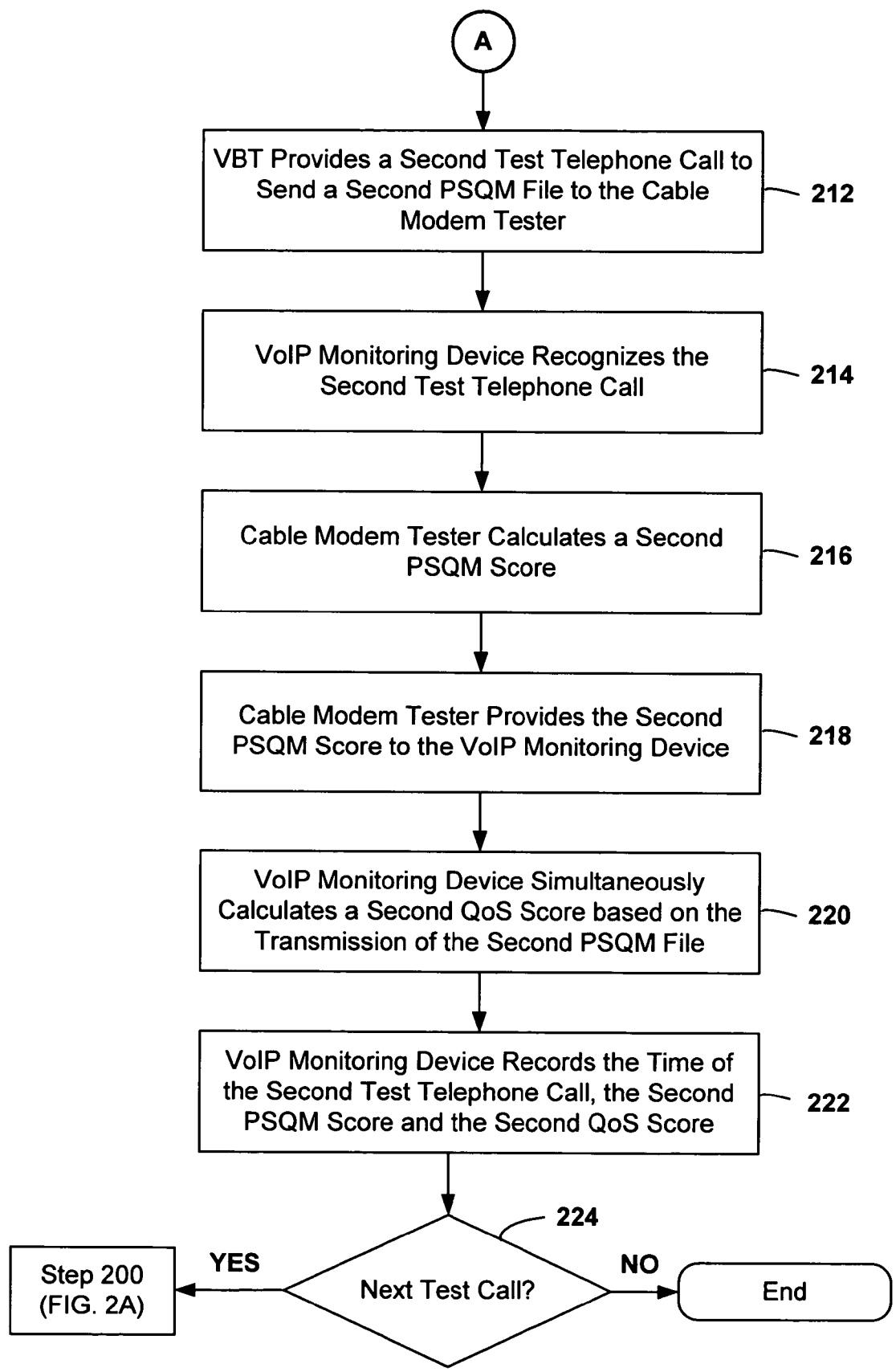

Referring now to FIGS. 2A and 2B, therein are shown flowcharts of a method for determining the PSQM and QoS score of test phone calls using the packet communications network 100 as shown in FIG. 1 in accordance with the present invention.

In one embodiment, the method begins in step 200 with the cable modem tester 108 generating a first test telephone call with a signal having a unique pattern that is formatted in accordance with the Packet Network Base Call Signal (NCS) protocol. The signal includes a first PSQM file.

The cable modem tester 108 sends (or transmits) a first PSQM file via the CMTS 104 to the VBT 116, which is located at the central office. In this embodiment, the cable modem tester 108 is located at a customer site and replaces a BTI that is used at the customer site. Alternatively, the cable modem tester 108 may be integrated with a BTI at the customer site. In one embodiment, the signal further includes a special code which has, for example, an "X" preceding a command just as in the NCS Protocol.

In a step 202, the VoIP monitoring device 110 recognizes the test telephone call based on its unique pattern of the signal, such as the presence of a special code which includes an "X" preceding a command. The special code may also include an identifier that identifies the cable modem tester 108. The VoIP monitoring device 110 starts tracking signal transmissions, that is, calls from the cable modem tester 108 to the VBT 116.

In a step 204, the VBT 116 receives a first received PSQM file and calculates a first PSQM score (or a forward PSQM score as will later be described) based on the first PSQM file that was sent by the cable modem tester 108 and the first received PSQM file that is actually received by the VBT 116. As described earlier, the VBT 116 keeps a copy of the first PSQM file in its memory and this copy of the first PSQM file is used to calculate the first PSQM score.

In a step 206, the VBT 116 provides the first PSQM score to the VoIP monitoring device 110.

In a step 208 that is performed simultaneously with step 206, the VoIP monitoring device 110 performs a first QoS measurement on the traffic density during the transmission of the first PSQM file from the cable modem tester 108 to the VBT 116 and calculates a first QoS score.

In a step 210, the VoIP monitoring device 110 records the time of the first test telephone call, the first PSQM score and the first QoS score. In one embodiment, the VoIP monitoring device 110 provides the time of the first test telephone call, the first PSQM score and the first QoS score to the CMTS 104 for storage.

In a step 212, the VBT 116 generates a second test telephone call with a signal having a unique pattern that is formatted in accordance with the Packet Network Base Call Signal (NCS) protocol via the CMTS 104 to the cable modem tester 108 located at the customer site. The signal includes a second PSQM file. In one embodiment, the signal further includes a special code which includes, for example, an "X" preceding a command.

In a step 214, the VoIP monitoring device 110 recognizes the test telephone call based on its unique pattern of the signal, which may include a special code. The special code may use an "X" preceding a command. The special code may also include an identifier that identifies the VBT 116.

The VoIP monitoring device 110 starts tracking signal transmissions from the VBT 116 to the cable modem tester 108.

In a step 216, the cable modem tester 108 receives a second received PSQM file and calculates a second PSQM score (or a reverse PSQM score as will later be described) based on the second PSQM that was sent by the VBT 116 and the second received PSQM file that is actually received by the cable modem tester 108. As described earlier, the cable modem tester 108 keeps a copy of the second PSQM file in its memory and this copy of the second PSQM file is used for calculating the second PSQM score.

In a step 218, the cable modem tester 108 provides the second PSQM score to the VoIP monitoring device 110.

In a step 220 that is performed simultaneously with step 218, the VoIP monitoring device 110 performs a second QoS measurement based on the traffic density of the transmission of the second PSQM file going in the opposite direction from the VBT 116 to the cable modem tester 108 and calculates a second QoS score. The measurements are in the same directions as the PSQM files are transmitted.

In a step 222, the VoIP monitoring device 110 records the time of the second test telephone call, the second PSQM score and the second QoS score. In one embodiment, the VoIP monitoring device 110 provides the time of the second test telephone call, the second PSQM score and the second QoS score to the CMTS 104 for storage.

In a step 224, the cable modem tester 108 determines if it is time to generate a third test telephone call. If so, the method returns to step 200. Otherwise, the method ends.

In a second embodiment, only the cable modem tester 108 is used to generate test telephone calls. In this case, the method will go through steps 200 to 210, and then to 224.

Figure 3B:
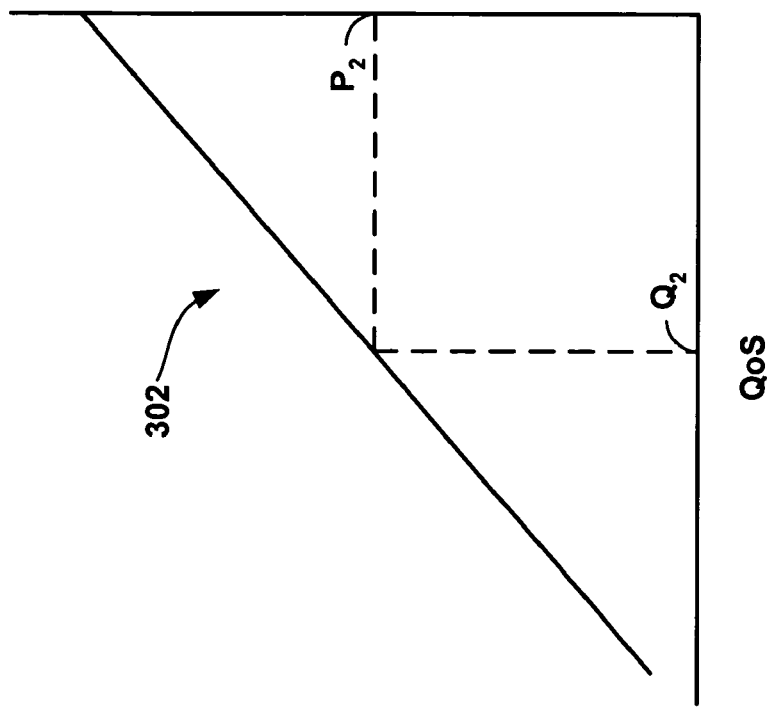
FIG. 3B shows a graph of the reverse PSQM score as a function of the QoS.
Figure 3A:
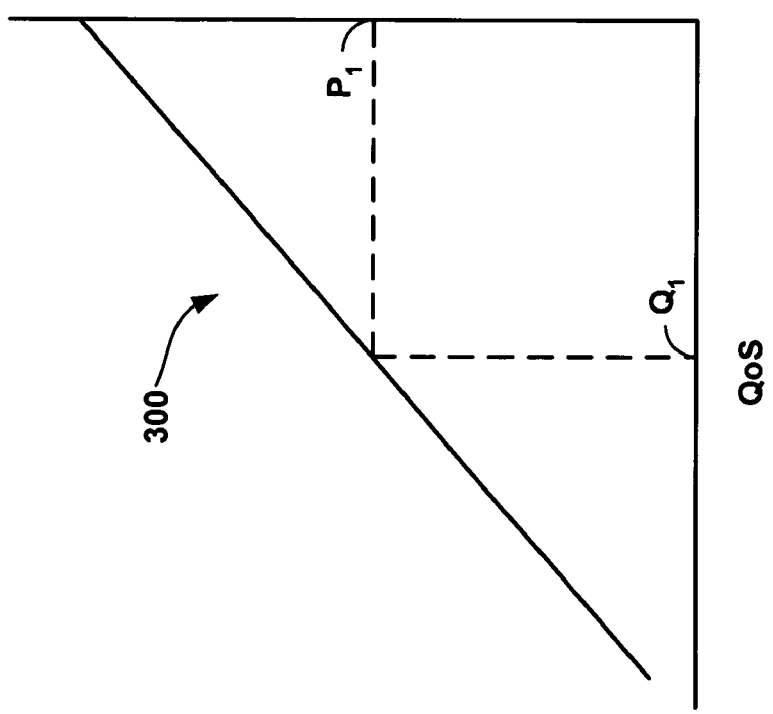
FIG. 3A shows a graph of the forward PSQM score as a function of the QoS.

Referring now to FIG. 3A, therein is shown a graph 300 of the forward PSQM score as a function of the corresponding QoS score. As used herein, forward PSQM scores refer to PSQM scores calculated by the VBT 116 of PSQM files that are sent by the cable modem tester 108 to the VBT 116. For example, the first PSQM score described in FIG. 2A is a forward PSQM score. As the QoS score decreases (i.e., the QoS becomes more negative), the forward PSQM score decreases. The graph 300 can be prepared by generating a number of test telephone calls from the cable modem tester 108 to the VBT 116 at different times and from different locations, and obtaining the forward PSQM scores and the corresponding QoS scores using the method in accordance with the present invention as described in FIGS. 2A and 2B.

$P_1$ is the minimum forward PSQM score allowable for an acceptable signal transmission in a packetized network. $Q_1$ is the QoS value that corresponds to P1. Therefore, the graph 300 allows a user to monitor the signal transmissions in the communications network 100 by keeping track of the QoS scores, which can be used to predict the corresponding PSQM scores. When QoS score drops to $Q_1$ or below, it means that the predicted forward PSQM score is not acceptable which indicates network problems. A message may be sent to the user to inform the user that services to the communications network 100 may be needed to restore signal transmission quality.

Referring now to FIG. 3B, therein is shown a graph 302 of reverse PSQM score as a function of the corresponding QoS score. As used herein, reverse PSQM scores refer to PSQM scores calculated by the cable modem tester 108 of PSQM files that are sent by the VBT 116 to the cable modem tester 108. For example, the second PSQM score described in FIG. 2B is a reversed PSQM score. As the QoS score decreases (i.e., the QoS becomes more negative), the reversed PSQM score decreases. The graph 302 can be prepared by generating a number of test telephone calls from the VBT 116 to the cable modem tester 108 at different times and from different locations, and obtaining the reverse PSQM scores and the corresponding QoS scores using the method in accordance with the present invention as described in FIGS. 2A and 2B.

$P_2$ is the minimum reverse PSQM score allowable for an acceptable signal transmission in a packetized network. $Q_2$ is the QoS value that corresponds to $P_2$. Therefore, graph 302 allows a user to monitor the signal transmission in the communications network 100 by keeping track of the QoS. When QoS drops to $Q_2$ or below, it means that the reverse PSQM score is not acceptable which indicates network problems. A message may be sent to the user to inform the user that services to the communications network 100 may be needed to restore signal transmission quality.

Therefore, the present invention provides a method and system for monitoring the signal transmission quality of a communications network. Specifically, QoS can be used to predict the corresponding TIT scores, such as forward or reverse PSQM scores, and allow a user to keep track of quality of signal transmissions in the communications network.

While the best mode describes calculating PSQM scores, and using QoS to predict corresponding PSQM scores to keep track of the quality of signal transmission in a communications network, it should be understood that the present invention is applicable to other type of TIT scores such as the PESQ scores.

Further, the present invention is also applicable to Digital Subscriber Line (DSL) technology and Voice over DSL (VoDSL) technology. In this case, the BTIs 102a and 102b will be replaced by DSL modems; the cable modem tester 108 will be replaced by DSL modem tester; the CMTS 104 will be replaced by a DSL Access Multiplexer (DSLAM).

While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A communications network, comprising:
    a modem termination system (MTS);
    a voice band tester (VBT) coupled to the MTS, the VBT being located at a first location;
    a modem tester coupled to the MTS, the modem tester being located at a second location remote from the first location, the modem tester adapted to provide a first communication signal to the VBT via the MTS; and
    a Voice over Internet Packet (VoIP) monitoring device coupled to the MTS and the VBT, the VoIP monitoring device adapted to monitor the first communication signal, and calculate a first Quality of Services (QoS) score based on traffic density between the MTS and the VBT; wherein the VBT is adapted to:
        calculate a first Transmission Impairment Test (TIT) score based on the first communication signal and a first received communication signal received by the VBT from the modem tester, and
        provide the first TIT score to the VoIP monitoring device.

2. The communications network as claimed in claim 1 wherein the first communication signal and the first received communication signal include TIT files.

3. The communications network as claimed in claim 1 wherein:
the first TIT score is a score selected from the group consisting of Perceptual Speech Quality Measurement (PSQM) score and Perceptual Evaluation of Speech Quality (PESQ) score; and
the TIT files are files selected from the group consisting PSQM files and PESQ files.

4. The communications network as claimed in claim 1 wherein:
the first QoS score is determined based on factors selected from a group consisting of packet losses, jitter, and delays in the transmission of the first communication signal from the modem tester to the VBT.

5. The communications network as claimed in claim 1 wherein the first communication signal contains a special code detectable by the VoIP monitoring device, and the VoIP monitoring device begins to monitor signal transmissions from the modem tester to VBT via the MTS once the special code is detected.

6. The communications network as claimed in claim 1 wherein the MTS is part of a network system selected from a group consisting of a wired network system, a wireless network system, and a combination thereof.

7. The communications network as claimed in claim 1 wherein the VoIP monitoring device is adapted to provide the first PSQM score, and the first QoS score to the MTS for storage.

8. The communications network as claimed in claim 1 further comprising:
a Broadband Termination Interface (BTI) coupled to the MTS, the BTI adapted to convert broadband signals to signals selected from a group consisting of television, packetized data, video, voice, and a combination thereof.

9. The communications network as claimed in claim 1 wherein the modem tester is integrated with the BTI.

10. A communications network, comprising:
a Digital Subscriber Line Access Multiplexer (DSLAM);
a voice band tester (VBT) coupled to the DSLAM, the VBT being located at a first location;
a Digital Subscriber Line (DSL) tester coupled to the DSLAM, the DSL modem tester being located at a second location remote from the first location, the DSL modem tester adapted to provide a first communication signal to the VBT via the DSLAM; and
a Voice over DSL (VoDSL) monitoring device coupled to the DSLAM and the VBT, the VoDSL monitoring device adapted to monitor the first communication signal, and calculate a first Quality of Services (QoS) score based on traffic density between the CMTS and the VBT; wherein the VBT is adapted to:
calculate a first Transmission Impairment Test (TIT) score based on the first communication signal and a first received communication signal received by the VBT from the DSL modem tester, and
provide the first TIT score to the VoDSL monitoring device.

11. A method for monitoring quality of signal transmissions within a communications network, comprising:
providing a first communication signal from a cable modem tester located at a first location to a voice band tester (VBT) located at a second location remote from the first location via a Cable Modem Termination System (CMTS);
identifying the first communication signal and begins monitoring signal transmissions from the cable modem tester to the VBT via the CMTS;
calculating a first Transmission Impairment Test (TIT) score based on the first communication signal and a first received communication signal received by the VBT from the cable modem tester;
providing the first TIT score to a Voice over Internet Packet (VoIP) monitoring device; and
calculating a first Quality of Services (QoS) score based on traffic density between the CMTS and the VBT.

12. The method as claimed in claim 11 wherein identifying the first communication signal includes identifying a special code detectable by the VoIP monitoring device.

13. The method as claimed in claim 12 wherein the special code includes an identifier which identifies the cable modem tester and wherein the MTS is part of a network system selected from a group consisting of a wired network system, a wireless network system, and a combination thereof.

14. The method as claimed in claim 11 wherein:
calculating the first QoS score uses factors selected from a group consisting of packet losses, jitter, and delays in the transmission of the first communication signal from the cable modem tester to the VBT.

15. The method as claimed in claim 11 further including:
predicting a TIT score based on a QoS score;
informing a user of the communications network that services to the communications network may be needed to restore signal transmission quality if the TIT score is below a minimum TIT score.

16. The method as claimed in claim 11 wherein the first communication signal and the first received communication signal include TIT files.

17. The method as claimed in claim 16 wherein:
the first TIT score is a score selected from the group consisting of Perceptual Speech Quality Measurement (PSQM) score and Perceptual Evaluation of Speech Quality (PESQ) score; and
the TIT files are files selected from the group consisting PSQM files and PESQ files.

18. A method for monitoring quality of signal transmissions within a communications network, comprising:
providing a first communication signal from a Digital Subscriber Line (DSL) tester located at a first location to a voice band tester (VBT) located at a second location remote from the first location via a Digital Subscriber Line Access Multiplexer (DSLAM);
identifying the first communication signal and begins monitoring signal transmissions from the DSL modem tester to the VBT via the DSLAM;
calculating a first Transmission Impairment Test (TIT) score based on the first communication signal and a first received communication signal received by the VBT from the DSL modem tester;
providing the first TIT score to a Voice over DSL (VoDSL) monitoring device; and
calculating a first Quality of Services (QoS) score based on a transmission of the first communication signal from the DSL modem tester to the VBT.

* * * * *